April 30, 1957 J. WYSSEN 2,790,561
HOISTING AND CONVEYING APPARATUS
Filed June 20, 1951 12 Sheets-Sheet 1
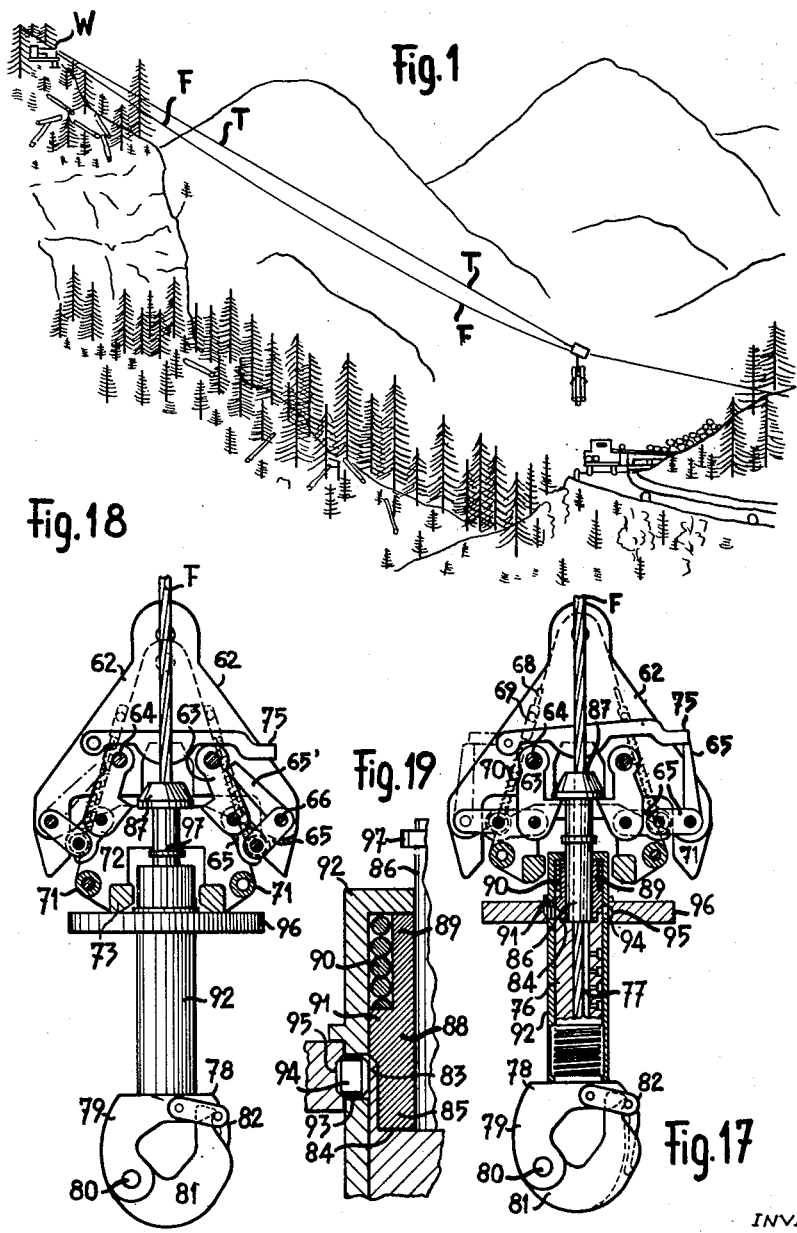
INVENTOR.
Jacob Wyssen.
BY
Emory L. Groff
ATTORNEY April 30, 1957     J. WYSSEN     2,790,561
HOISTING AND CONVEYING APPARATUS
Filed June 20, 1951     12 Sheets-Sheet 2
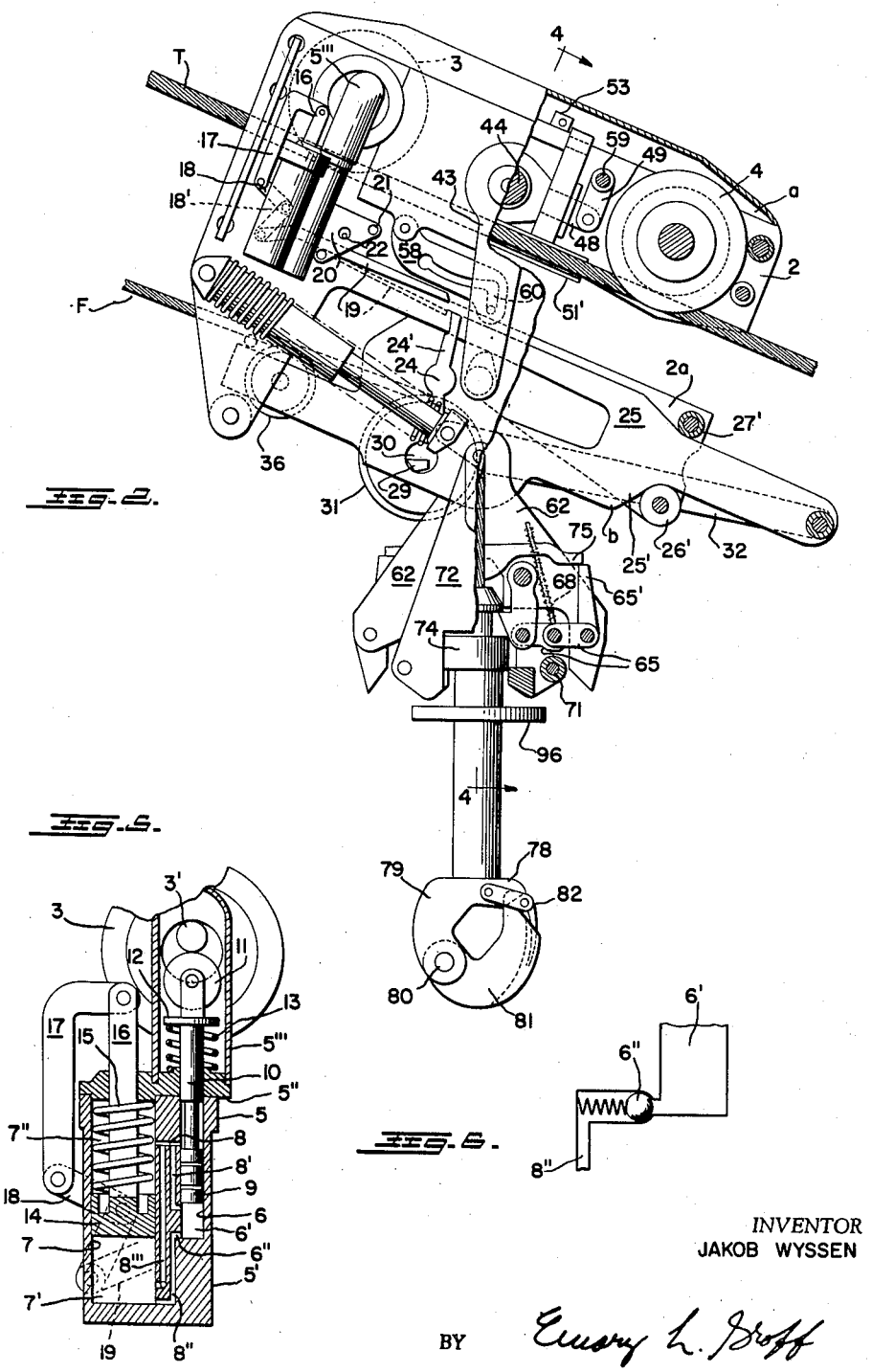
INVENTOR
JAKOB WYSSEN

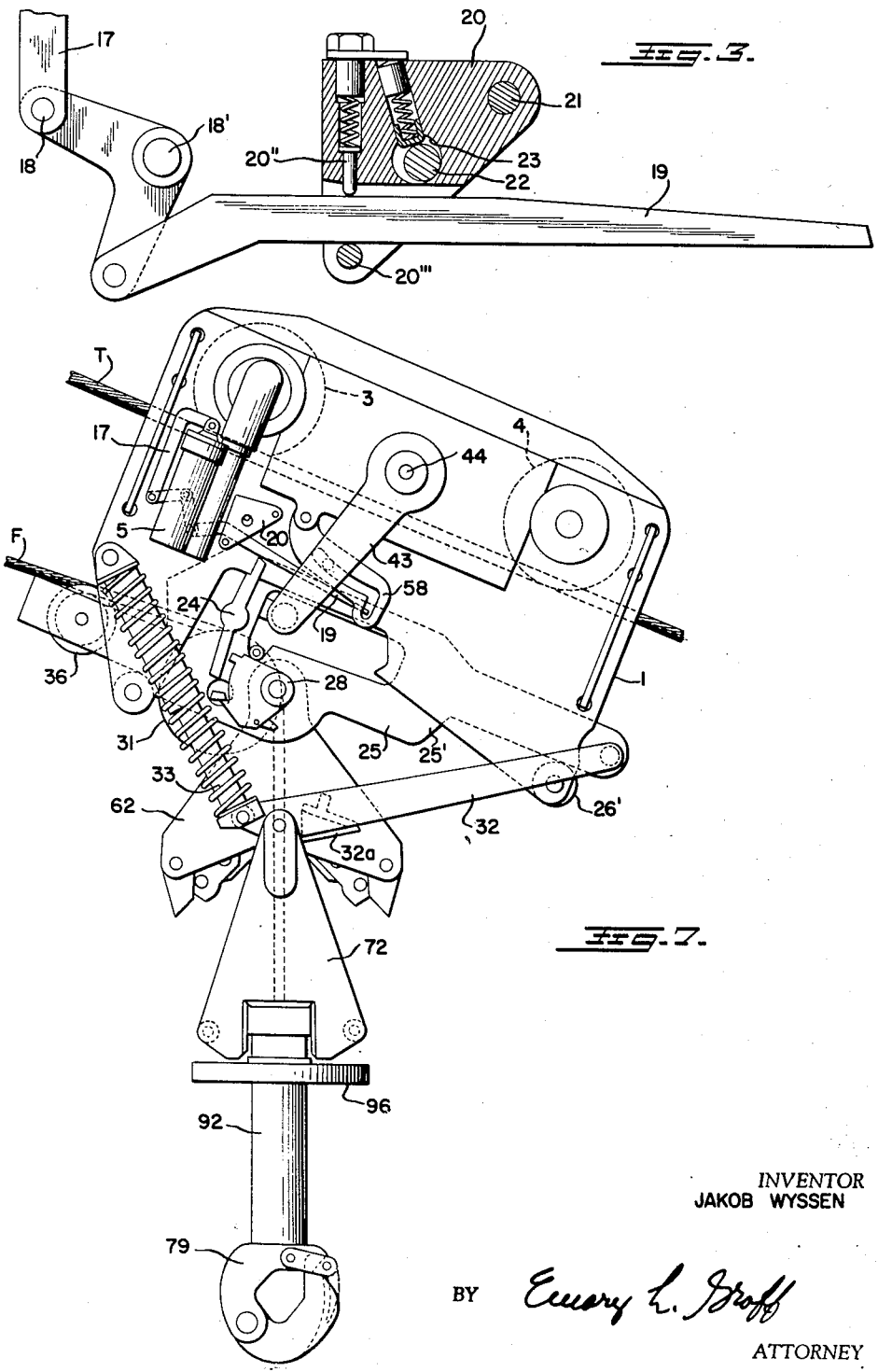

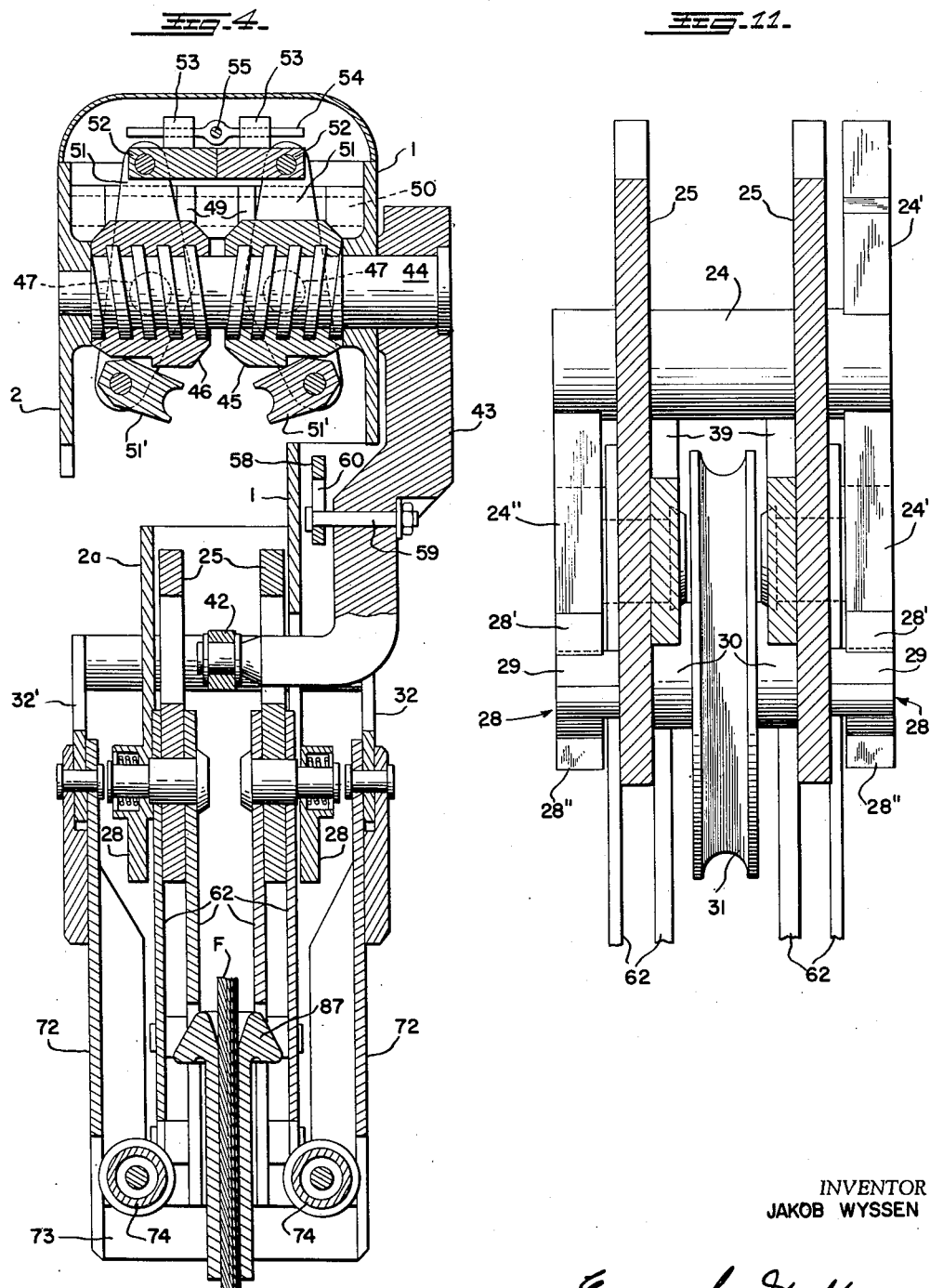

April 30, 1957 J. WYSSEN 2,790,561
HOISTING AND CONVEYING APPARATUS
Filed June 20, 1951 12 Sheets-Sheet 5
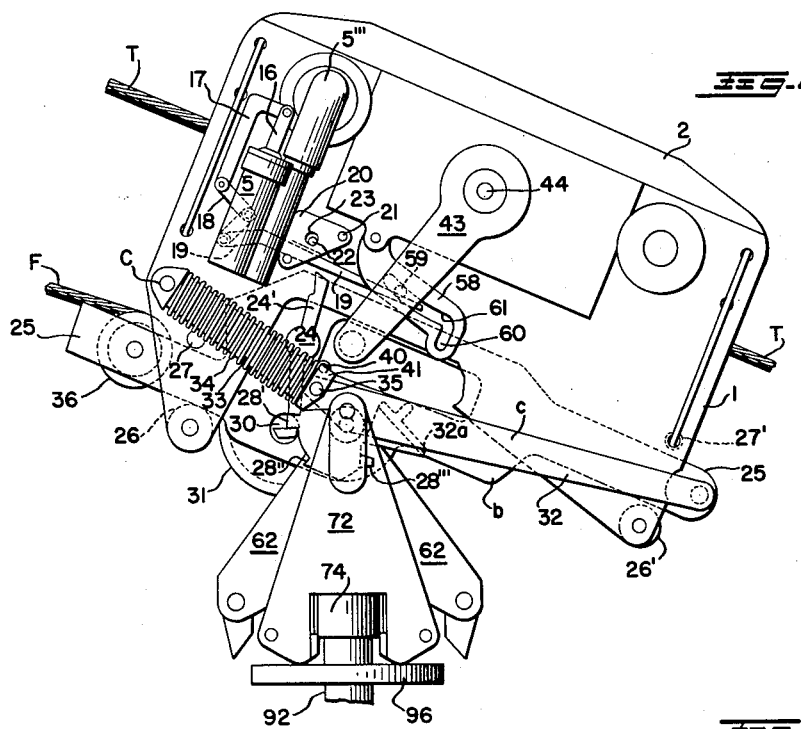
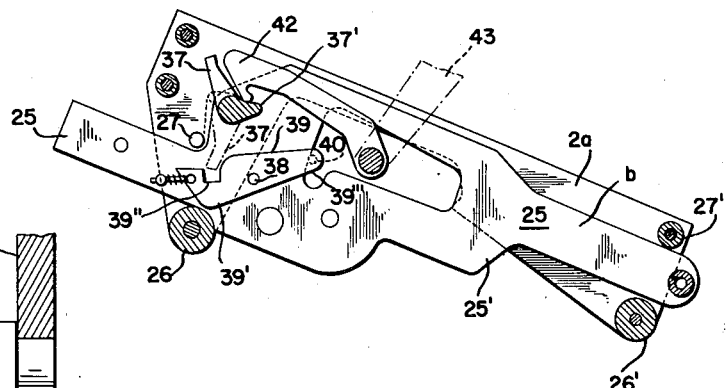
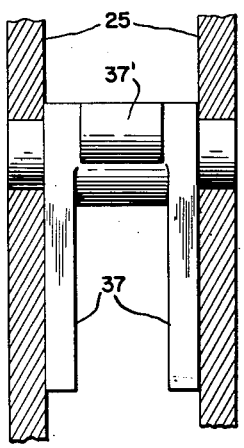
INVENTOR
JAKOB WYSSEN
BY *Emory L. Groff*
ATTORNEY April 30, 1957 J. WYSSEN 2,790,561
HOISTING AND CONVEYING APPARATUS
Filed June 20, 1951 12 Sheets-Sheet 6
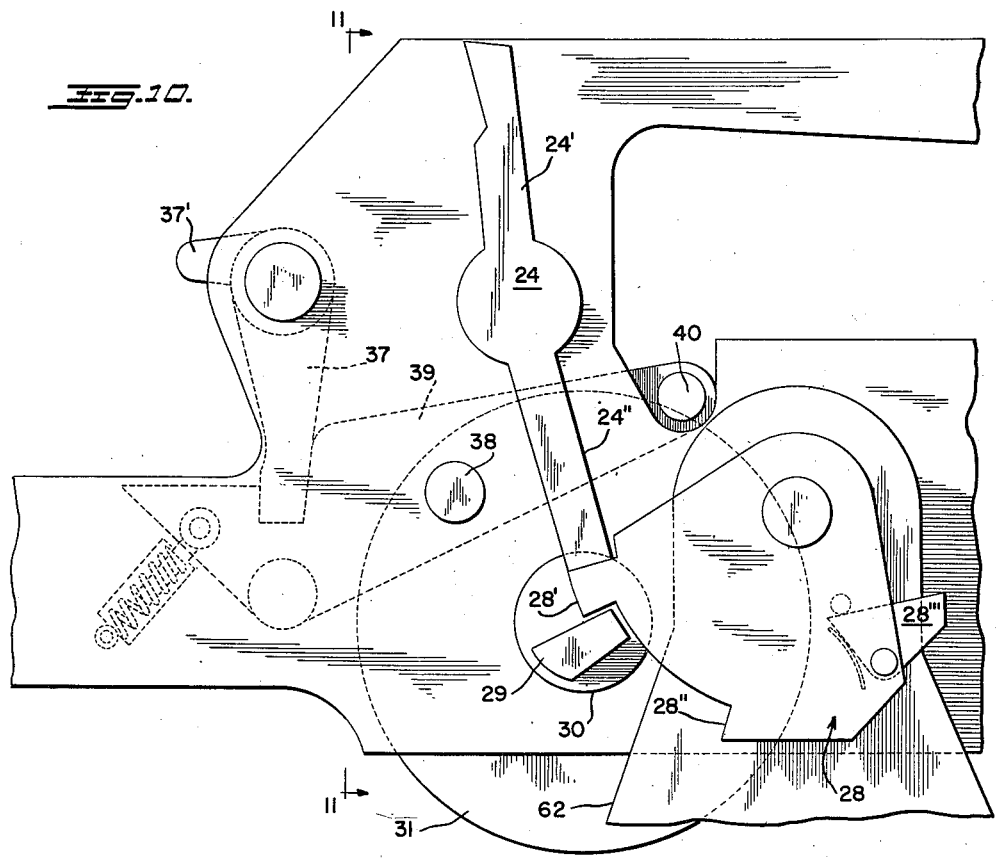
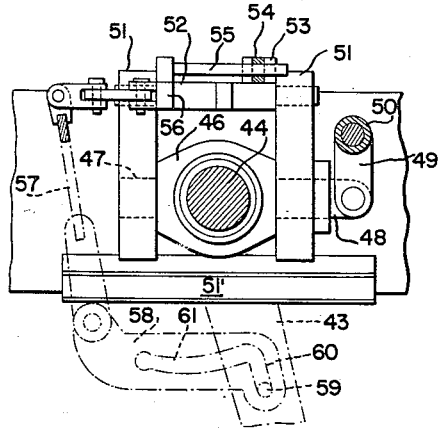
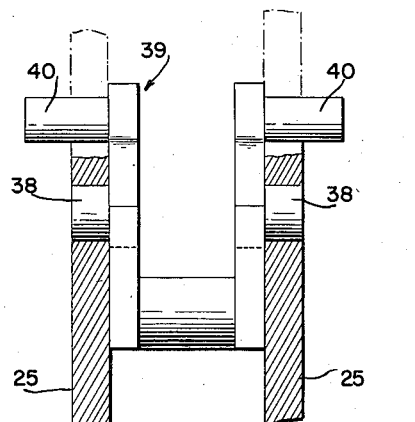
INVENTOR
JAKOB WYSSEN
BY *Emery L. Groff*
ATTORNEY

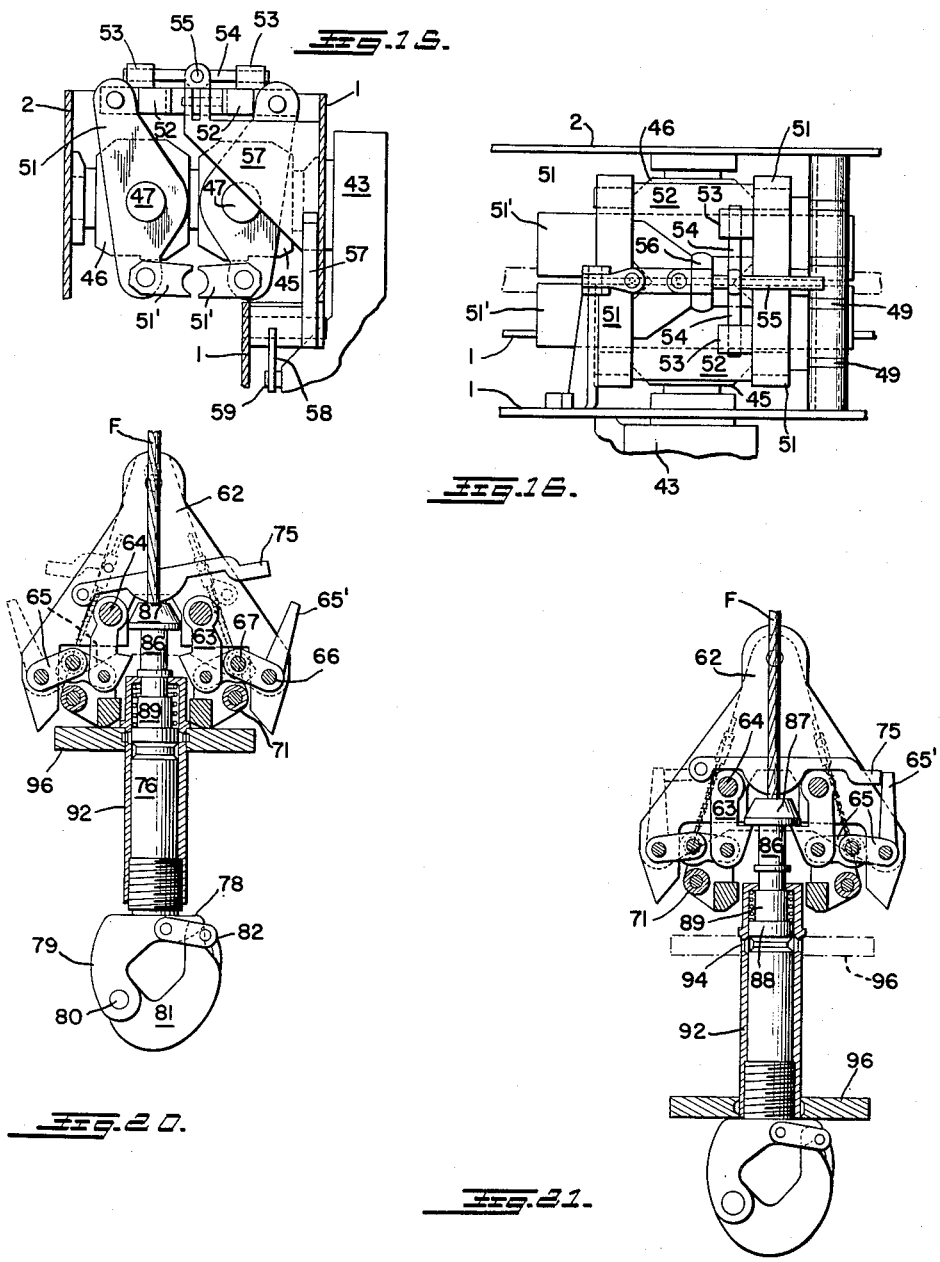

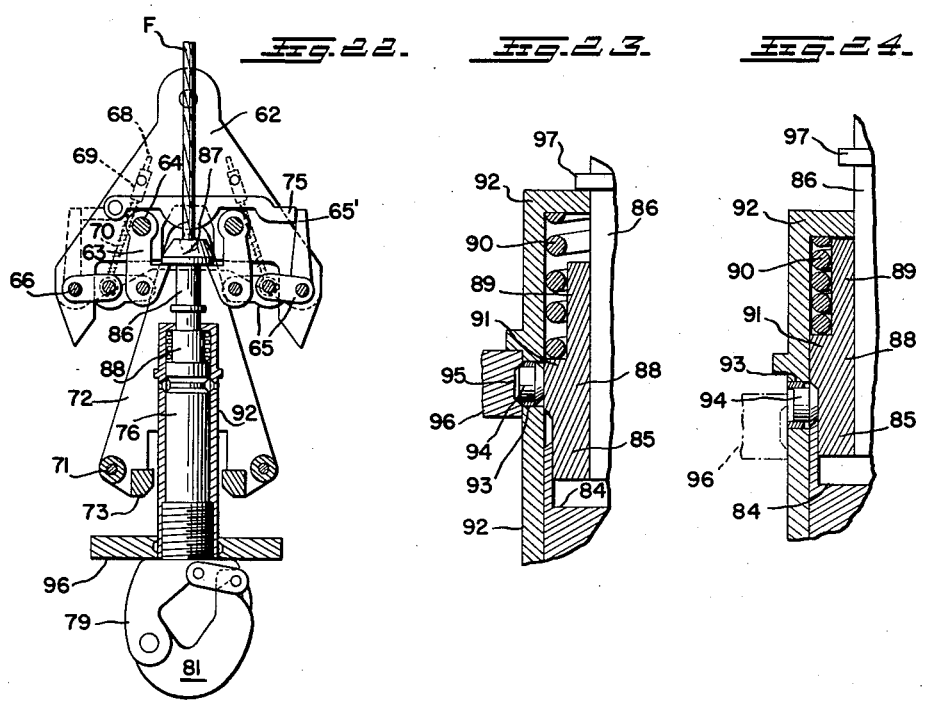
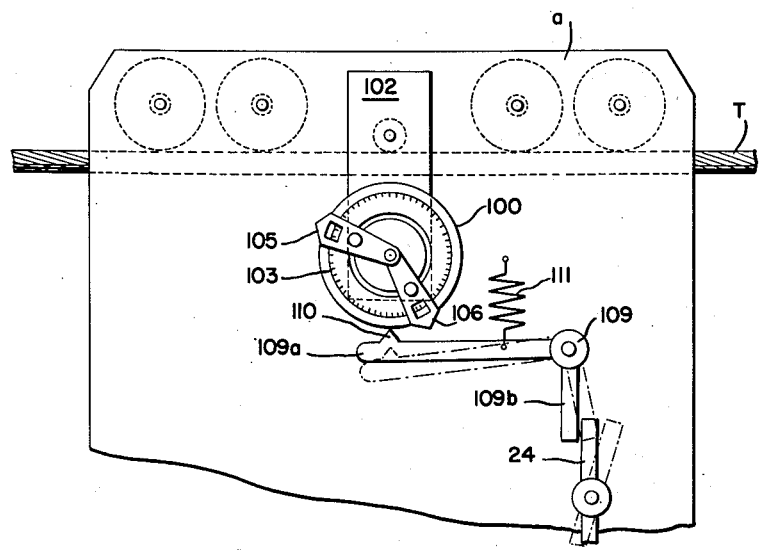

April 30, 1957  J. WYSSEN  2,790,561
HOISTING AND CONVEYING APPARATUS
Filed June 20, 1951  12 Sheets-Sheet 9

INVENTOR
Jacob Wyssen.

BY Emory L. Groff
ATTORNEY

April 30, 1957 J. WYSSEN 2,790,561
HOISTING AND CONVEYING APPARATUS
Filed June 20, 1951 12 Sheets-Sheet 10
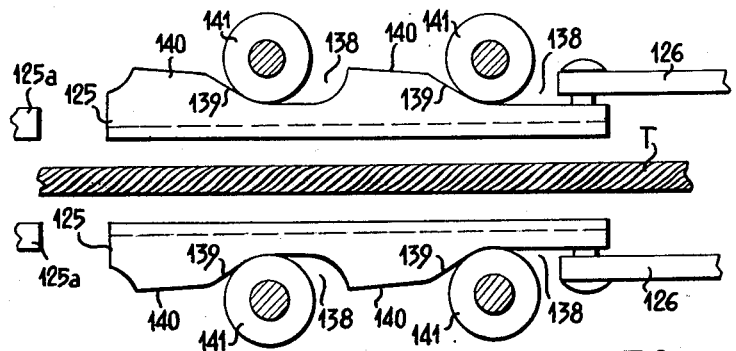
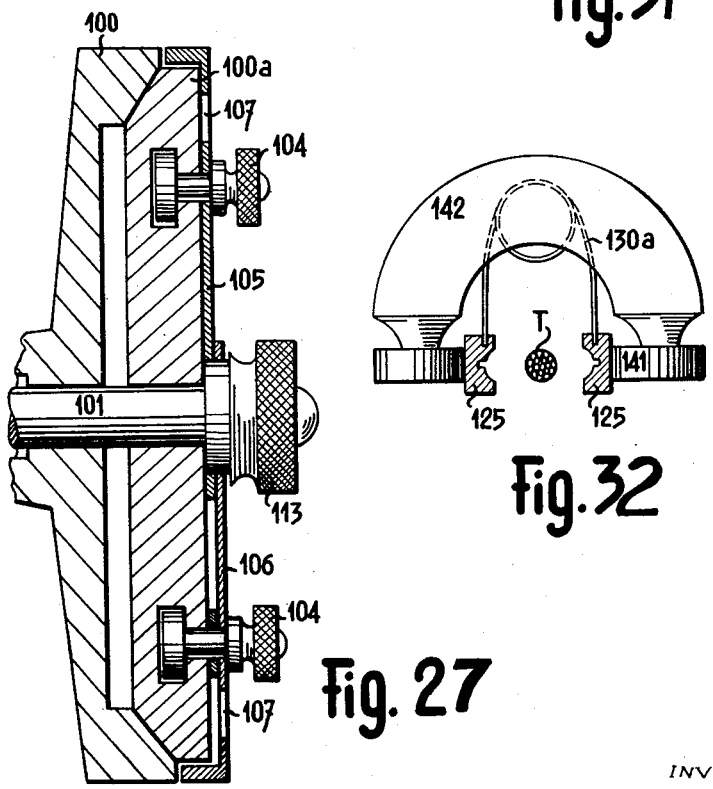
INVENTOR
Jacob Wyssen.
BY
ATTORNEY April 30, 1957  J. WYSSEN  2,790,561
HOISTING AND CONVEYING APPARATUS
Filed June 20, 1951  12 Sheets-Sheet 11
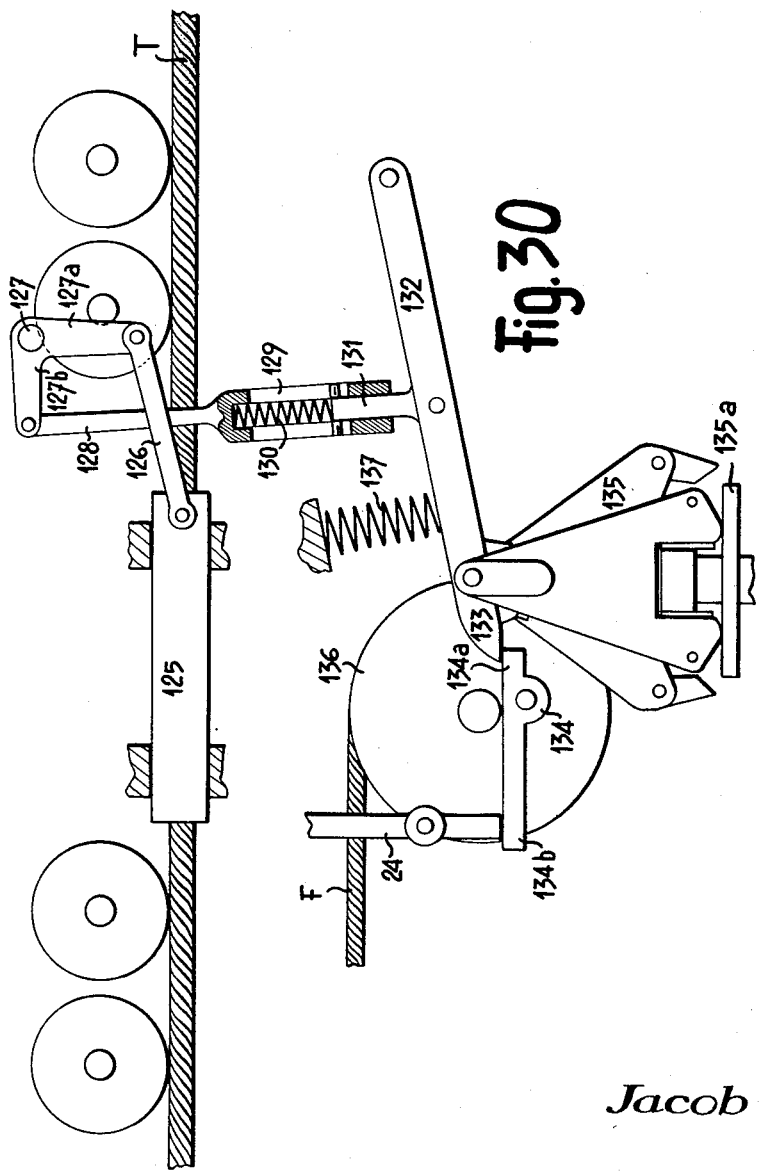
INVENTOR.
Jacob Wyssen.
BY
Emory L. Groff
ATTORNEY April 30, 1957 J. WYSSEN 2,790,561
HOISTING AND CONVEYING APPARATUS
Filed June 20, 1951 12 Sheets-Sheet 12

INVENTOR
JAKOB WYSSEN
BY Emory L. Groff
ATTORNEY

United States Patent Office 2,790,561
Patented Apr. 30, 1957

2,790,561

HOISTING AND CONVEYING APPARATUS

Jakob Wyssen, Reichenbach i. K., Switzerland

Application June 20, 1951, Serial No. 232,596

Claims priority, application Switzerland June 21, 1950

6 Claims. (Cl. 212—92)

This invention relates to hoisting and conveying apparatus for transporting timber from steep and poorly accessible timber lands to a loading point.

Heretofore, fallen timber has been transported by means of the well-known timber slides which consist in the rolling of the fallen timber down steep grades and into a flowing stream, whereby said timber is forced to the desired loading station or points. This procedure results in considerable damage to said timber and in loss of many man-hours.

With the apparatus of this invention, it is possible to transport all fallen timber situated within 100 meters from the path traversed by said apparatus without a change in its direction of travel to the desired loading station.

The apparatus incorporates a combination of structural components which enables it to be stopped at any predetermined point, for a predetermined time, along its path of travel and to pick up a load of timber for carriage to a desired loading point. This combination includes a carriage riding on a cable and having attached thereto a control means which is actuated by the movement of the carriage along the cable and which causes the carriage to become fixedly clamped to the cable upon stopping. Simultaneous with the clamping of the carriage to the cable, the loading cable is caused to be lowered towards the load to be picked up, and this loading cable is also used for carrying the load, thereby obviating the need for a separate hoisting cable and a separate conveying cable. The apparatus can be stopped at any point along its path of travel without the accompanying release of its load, and this is made possible by a control means operatively connected to the load releasing means, and this control means is of the type which can be preset to operate the load releasing means only after the apparatus will have traversed a predetermined distance.

An object of this invention is to provide a hoisting and conveying apparatus comprising control means for automatically clamping the carriage of said apparatus to its carrying cable and simultaneously automatically releasing the load-hitching device attached thereto, whereby the carriage may be stopped on its carrier cable and be fixedly clamped thereto while the load is being picked up or while the load is being released.

Another object of this invention is to provide a hoisting and conveying apparatus comprising a time-release control means for automatically clamping the carriage of said apparatus to its carrying cable and simultaneously automatically releasing the load-hitching device after a predetermined time interval subsequent to the stopping of movement of the carriage on its carrier cable.

A further object of this invention is to provide a hoisting and conveying apparatus comprising a distance-release control means for automatically clamping the carriage of said apparatus to its carrying cable and simultaneously automatically releasing the load-hitching device after the apparatus will have traversed a predetermined distance along the carrier cable and will have stopped.

A further object of this invention is to provide a hoisting and conveying apparatus comprising a time-release control means operatively connected to a distance-release control means, for automatically clamping the carriage of the apparatus to its carrying cable and simultaneously automatically releasing the load-hitching device after the apparatus will have travelled a predetermined distance and after the carriage will have been stopped for a predetermined time period.

Other objects and features will become apparent from the following detailed description.

Figure 1 is a view in perspective of the installation and shows the hoisting and conveying apparatus positioned on its carrier cable anchored in position on the mountain side and in the valley.

Figure 2 is a side view, partly in section, of the carriage portion of the hoisting and conveying apparatus, including the time-release control means and the load-hitching means in conveying position.

Figure 3 is an enlarged fragmentary view of a portion of apparatus shown in Figure 2.

Figure 4 is a sectional view on line IV—IV of Figure 2.

Figure 5 is a vertical section view of the oil pump mounted on the carriage of Figure 2.

Figure 6 is an enlarged fragmentary view of a portion of the pump shown in Figure 5.

Figure 7 is a side view, partly in section, of the carriage portion of the hoisting and conveying apparatus, including the load-hitching means, said carriage portion being in braked position during the lowering of the load hook.

Figure 8 is a side view, partly in section, of the carriage portion of the hoisting and conveying apparatus including the load hitching means, after the load hook has been lifted and before it reaches the position shown in Figure 2.

Figure 9 is a longitudinal section of the lower portion of the carriage showing the positioning of the means for actuating the clamping device at the moment of the lifting of the load and of the opening of the brake.

Figure 10 is an enlarged fragmentary view of a portion of the section of Figure 9 showing the position of said actuating means after the carriage has been clamped and while the load is being lifted.

Figure 11 is a sectional view on line XI—XI of Figure 10.

Figures 12 and 13 are sectional views taken on lines in the same plane as line XI—XI of Figure 10.

Figure 14 is a side elevational view, partly in section, of the carriage carrying cable clamping means in open position.

Figure 15 is a front view of the carriage carrying cable clamping means in closed position.

Figure 16 is a top view of the carriage carrying cable clamping means in closed position.

Figure 17 is a vertical section view and Figure 18 is a vertical view, partly in section, of the load-hitching means and the load hook for lowering the load along a slack hoisting and conveying rope.

Figure 19 is an enlarged fragmentary view of the apparatus shown in Fig. 17.

Figures 20, 21, and 22 are views in vertical section and in partial vertical section of the load-hitching means and the load hook in various positions in the lowering of the load along the stressed hoisting and conveying rope.

Figures 23 and 24 are enlarged fragmentary views, similar to Figure 19, of the apparatus of Figures 17, 20, 21, and 22, the component parts shown in said figures being in various positions.

Figure 25 is a partial side elevational view of the carriage of the hoisting and conveying apparatus including a distance-release control means mounted on the carriage.

Figure 26:
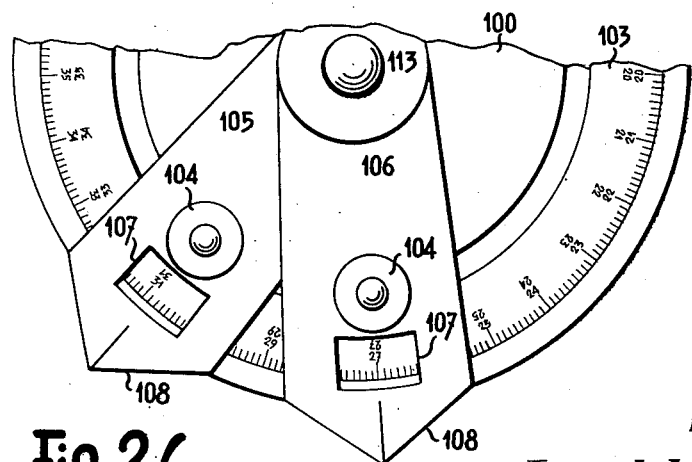

Figure 26 is an enlarged fragmentary view of a portion of the distance-release control means of Figure 25.

Figure 27 is an enlarged fragmentary view, in axial section, of a portion of the distance-release control means of Figure 25.

Figure 28:
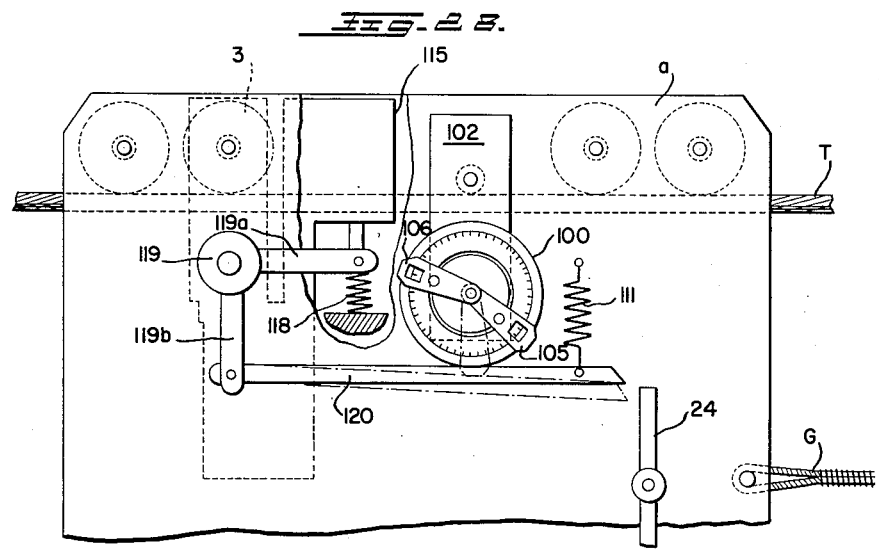

Figure 28 is a partial side elevational view of the carriage of the hoisting and conveying apparatus including a time-release control means operatively connected to a distance-release control means, each of said control means being mounted on the carriage.

Figure 29:
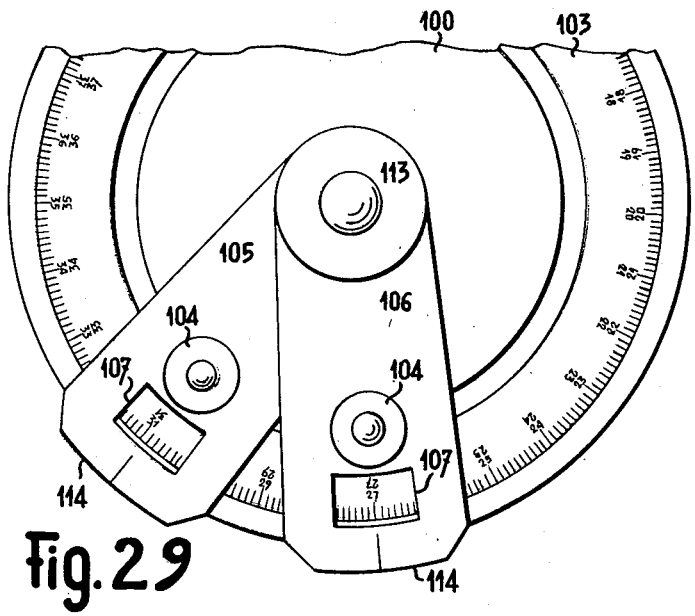

Figure 29 is an enlarged fragmentary view of a portion of the distance-release control means of Figure 28.

Figure 30 is a side elevational view, partly in section, of an alternative embodiment of a carriage carrying cable clamping means.

Figure 31 is a top view, partly in section, of the clamping means of Figure 30.

Figure 32 is the front view, partly in section, of the clamping means of Figure 30.

Figure 33:
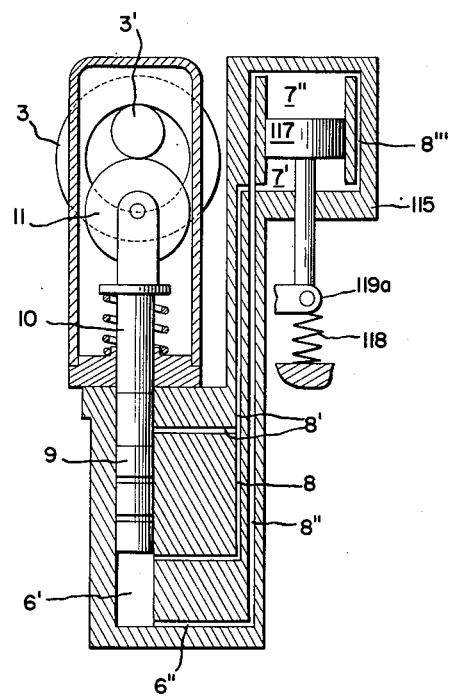

Figure 33 is a section through the oil pump of Figure 28.

More specifically, a motor winch W is positioned on a mountain side, and, on the cable drum of said winch W, one end of a hoisting and conveying cable F is secured for winding therearound, the other end of said cable being connected to a load hook member operatively connected to the carriage a of the hoisting and conveying apparatus. A carrying cable T for the carriage a is anchored, at one end, on the mountain side adjacent the winch W and runs therefrom to a discharge point to a valley where its other end is anchored.

The carriage a consists of a housing having a front wall 1 which is rigidly connected by spacer bolts 27' to the rear wall portions 2 and 2a, leaving a space therebetween, as clearly shown in Figures 2 and 4.

Two spaced-apart rope sheaves 3 and 4 are positioned between the front wall 1 and the upper rear wall 2 and are mounted by means of axles attached to the respective walls. Said sheaves 3 and 4 are used as guide means for the carrying cable T, and the space between the upper rear-wall portion 2 and the lower rear-wall portion 2a makes possible the suspension of the carriage a on its carrying cable T, and this is clearly shown in Figures 2 and 4. Eccentrically mounted on the end of the axle of rope sheave 3 is the pin 3' as clearly shown in Figure 5. Mounted on the front wall 1 of the carriage a and below the bearing of the sheave 3 is a time-releasing device comprising an oil pump 5, a locking device comprising the lever 24 and the cam discs 28, the strutting members 32, 33 and 32', 33' for operating the load carrying means including the head 87 and the plates 62, 62, and the slide b including the plates 25, 25 for actuating the clamps 51, 51 of the carrying cable clamping means.

As clearly shown in Figure 5, the pin 3' projects into the housing 5''' of the piston rod 10 of the pump 5. The pump, which acts as a time-release means as will be readily understood, comprises a pump housing 5' sealed by cover 5'' connected to said housing 5'''. The housing 5' comprises two cylindrical bores 6 and 7, connected by channels 8, 8', 8'', and 8'''. In the smaller diameter bore 6 is positioned the piston 9 having connected thereto the piston rod 10 which has mounted at its end away from said piston 9 a roller 11. The roller 11 is kept in contact at all times with the pin 3' by spring 13 positioned between cover 5'' and flange 12 of the piston rod 10. Piston 14 in the larger diameter bore 7 divides said bore into two chambers 7' and 7''. Chamber 7' which is below piston 14 is filled with oil and is a pressure chamber, while chamber 7'' which is above the piston 14 is used as an oil supply chamber for the chamber 6' which is below the pump piston 9. The helical spring 15 is positioned about piston rod 16 and is held between piston 14 and cover. This spring 15 is utilized for acting against piston 14 and pushing said piston 14 downwards. The piston rod 16 projects through cover 5'', as shown in Figure 5, and is operatively and fixedly attached to the rectangularly off-set rod 17 having a downwardly extending arm portion hinged to one arm of angular lever 18 which rotates about pivot point 18', as clearly shown in Figure 2. The other arm of angular lever 18 is hinged to thrust rod 19 which actuates the locking device comprising lever 24 and the cam discs 28, as clearly shown in Figures 2, 3, and 5. The angular lever 18 is positioned between the pump housing 5' and the front wall 1 of the carriage a.

Because of the channels 8, 8', 8'', and 8''' being positioned as shown in Figure 5 and being within the housing 5' the oil pump will not be damaged as a result of jarring occasioned by the travelling of the carriage a, and further, the pump is so constructed that should any oil leakage take place from the chamber 6 or the chamber 7', it will flow to the storage chamber 7''.

The oil pump 5 operates as a time-release means and releases the locking device comprising lever 24 and cam discs 28 in the following manner:

The axle of sheave 3, said axle having pin 3' eccentrically mounted on its end, as clearly shown in Figure 5, is caused to revolve by the movement of the sheaves 3 and 4 along the carrying cable, resulting in the pin 3' traversing a circular path. The pin 3' in traversing this circular path is at all times in contact with roller 11 and exerts a pressure against roller 11 thereby causing the roller to act in opposition to the spring 13 and to bring about the alternate upward and downward movement of piston rod 10 and piston 9 operatively attached thereto. During the downward movement of piston 9 the oil in pump chamber 6' exerts a pressure against check valve 6''', opens same, and flows through channel 8'' into pressure chamber 7' which is below piston 14, thereby causing piston 14 to move upwardly against helical spring 15. During the upward movement of pump piston, and during the passing of the eccentrically mounted pin 3' beyond its dead-center position, chamber 6' is refilled with oil passing from storage chamber 7'' through channel 8', said cycle being continuously repeated while the carriage a is travelling along cable T. The piston 14 positioned in said bore 7, whose diameter is greater than the diameter of bore 6, is urged against the spring 15, thereby causing the compression of said spring, and the offset 17 attached at one end to piston rod 16 and to the toggle lever 18 at the other end thereof moves upwardly to turn said lever 18 and cause the withdrawal of the thrust rod 19 hinged to the other end of lever 18.

Now, should carriage a be stopped at a predetermined position along cable T, the pump piston 9 stops and the flow of oil into pressure chamber 7' ceases, causing the relaxing of the spring 15 and the accompanying flow of oil from pressure chamber 7' through channel 8''' into oil-storage chamber 7'' together with the downward movement of piston 14 and its attached piston rod 16. Accordingly, the rod 17 attached to piston rod 16 will be caused to move downwardly and will turn the toggle lever 18 causing the thrust rod 19 hinged thereto to shift in a forward direction, as clearly shown in Figures 2 and 5. As is clearly seen from Figures 2 and 3, guide 20 is pivotally mounted on pin 21 affixed to the front wall 1 of carriage a and serves as a guide for thrust rod 19 and as a safety member therefor. The guide 20 has a bore 23 into which projects stop 22 for limiting the rotation of guide 20 about pin 21, said stop being fixedly attached to the front wall 1 of carriage a. As is clearly shown by Figures 2 and 3, the diameter of bore 23 is greater than the diameter of stop 22. Also, positioned on guide 20 is the pin 20''' fixedly attached thereto, and in guide 20 is positioned the spring loaded bolt 20'', the thrust rod 19 riding and being positioned between said pin 20''' and bolt 20''. Further, guide 20 has mounted therein the spring loaded member 20' urged against the stop 22, as is clearly shown in Figure 3. As a result of the forward movement of thrust rod 19 which bears against pin 20''' under the action of spring loaded bolt 20'' and because of the rotation of guide 20 being limited by stop 22, the free end of thrust rod 19 is caused to move downwardly, as clearly shown by the dotted lines in Figure 2, towards the twin lever 24, which releases the locking cam discs 28. The pump 5 is caused to operate in such a manner that, after the rod 19 in its forward movement has pushed said lever 24, the helical spring 15 causes the piston 14 and thus the piston rod 16 downwardly. However, the guide 20, being limited in its rotation about pin 21 by the stop 22, is unable to rotate clockwise any further, thereby limiting the downward movement of thrust rod 19, and on further forward movement of said thrust rod 19, its front end will be disengaged from lever 24, thereby bringing about the return of the lever 24 to its initial position under spring action. Thus, the guide 20 ensures the proper functioning of lever 24 and allows for the release of the cam discs 28.

As clearly shown in Figures 9, 10, 11, and 12, the double-armed lever 24 comprises two downward pointing lever arms 24", 24", and the pivot of lever 24 is located in slide b comprising two plates 25, 25 spaced from each other and securely connected and movably mounted on two rollers 26, 26' positioned between the front wall 1 and the lower rear wall 2a, as shown in Figure 4. As insurance against the lifting of the plates 25, 25 of slide b, two bolts 27, 27' are provided in a transverse position with respect to plates 25, 25 and connecting the front wall 1 and the lower rear wall 2a. The ends of the lever arms 24", 24" serve as locking members for the cam discs 28 which are pivoted on the respective outer side of the plates 25, 25 of slide b and are under a torsional spring action. The cam discs 28 each have three cams 28', 28", and 28"'. Cam 28' serves as a locking cam; cam 28" serves as a stop cam for restricting the turning of cam disc 28; and cam 28"' serves as a support cam for the knee joint of the strutting members 32, 33 and 32', 33' which connect the housing of the carriage a and the plates 25, 25 of slide b, as clearly shown in Figures 2, 4, and 7.

The striking of the thrust rod 19 which is caused to move forward by the time-release pump 5 against the release-lever arm 24' of lever 24 results in the moving of the levers 24" from the locking cams 28' of cam discs 28 thereby allowing the cam discs 28 to be turned by the weight of the strutting members the knee joints of which rest on the support cam 28"' and thereby resulting in the bending-in and the lowering of the rear-side strutting members 32, 33, 32', 33'. The lowering of said strutting members results in the release of the aforementioned support cams of the cam discs 28 and the return of said cam discs 28, under torsional spring action, to their initial position in which they are locked by the torsional spring-loaded locking levers 24'.

The strutting members each consist of two interconnected lever arms 32, 33 and 32', 33', rigid members 32 and 32' being each hinged to the plates 25, 25 of slide b, as shown in Figure 4, and member 32 having the shoulder 32a projecting sideways therefrom. The lever arms 33 and 33' are hinged to the carriage a and are extensible in the direction of its length, as clearly shown in Figures 2, 7, and 8. Said lever arms 33 and 33' are each held in an extended position by means of the helical springs 34, 34' positioned between the two extreme ends thereof. The knee joint 35, as clearly shown in Figure 8, is supported by the support cam 28"', thus resulting in the carriage a and the slide b being connected as a rigid unit.

As clearly shown in Figure 11, the wheel 31 which guides the hoisting and conveying cable F is positioned between the plates 25, 25 of slide b, and the axle 30 on which wheel 31 is mounted is located in said slide plates and securely connected thereto. At the ends of the axle 30 are attached stops 29 which project into the recess between the locking cam 28' and the stop cam 28" portions of cam discs 28. These stops 29, the cam discs 28, and the locking lever arms 24', 24" constitute the locking device means for the aforementioned strutting lever members hinged to the front and rear walls of the carriage a and movably linked to the slide b. The knee joint 35 is supported by the support cam portion 28"' of the cam disc at the shoulder 32a, as clearly shown in Figures 7 and 8, which projects from the strutting lever arm members which are hinged to the slide b.

In the space between plates 25, 25 of slide b and attached thereto by means of an axle is positioned the sheave 36 for the hoisting and conveying cable F, as clearly shown in Figures 2, 7, and 8. As clearly shown in Figures 8, 9, 10, 11, 12, and 13, a torsional spring-acting cam lever 37 and a spring-loaded twin lever 39 rotatable about pivot member 38 are positioned between sheaves 31 and 36. The lever arms 39' of lever 39 has the arresting hook portions 39" to receive cam lever 37, and the other lever arm 39"' has stop pins 40 attached thereto which project through plates 25, 25 and, within the range of the strutting member stops 41, which rest against the knee joints 35 of the strutting members 32, 33, 32', 33', as clearly shown in Figures 2, 7, and 8.

Referring to Figure 4, two twin plate assemblies comprising plates 62, 62, 62, 62 are rotatably fitted to the plates 25, 25 of slide b in such a manner that each plate 25 is positioned between two plates 62, 62, which are connected to each other by transversely positioned bolts. The members positioned between said plates 62, including the member 87, constitute the load carrying device.

Referring to Figures 4, 9, and 12, a cam 37" is positioned between the members of the cam lever 37 and is within the range of a pawl 42 which is hinged to the operations lever 43 of the carrier cable clamping means including the clamping members 51', 51', positioned in the upper portion of the travelling carriage a between the sheaves 3 and 4, by means of which carriage a is securely clamped to cable T above the point where loads are lifted or lowered. Said lever 43 operates the carrier cable clamping device including members 51', 51'.

Upon the bending inwardly and lowering of the strutting members at their knee joint 45, the plates 25, 25 of the slide b are shifted into the inner portion of the housing of carriage a, and during this displacement of slide b, cam 37' of the cam lever 37, which is positioned between plates 25, 25 and is under the action of a torsional spring, engages pawl 42. The operations lever 43 then actuates the mechanisms in the upper portion of the housing of carriage a, as will be more specifically described, and causes the clamping of the carrier cable by clamping ledges 51', 51'.

Said lever 43, as is clearly shown in Figures 2, 4, 14, 15, and 16, is hinged to pawl 42, which is rigidly connected to a combined left-hand and right-hand threaded spindle 44 projecting through lever 43 through front wall 1, and through rear upper wall 2 between rope sheaves 3 and 4. About the threads of spindle 44 are positioned nuts 45 and 46 having the pins 47 and 48 projecting to the left and to the right, respectively, said pins being of different lengths. The ends of the longer pins 48 are each positioned between two plates 49 which are suspended from a rod 50 positioned between the front wall 1 and the rear wall 2 of the carriage a, thereby preventing the nuts 45 and 46 from turning as the spindle 44 turns, while the clamping ledges 51', 51' are held in a position parallel to cable T. The twin lever members 51, 51 are pivotally mounted on the laterally projecting pins 47 and 48 and said twin lever members have at their ends the clamping ledge 51', as shown in Figure 14.

Between the upwardly facing portions of levers 51, symmetrically designed support members 52 are mounted by means of pins and have on the small sides thereof which face each other a support surface and a notch approximately at the middle portion thereof. The remaining portion of each of members 52 forms a wedge surface tapering off in the direction of the bearing pin, as shown in Figure 16. The support members 52 have attached thereto at their upper broad sides a lug 53 having bores therein, and a rod 54 positioned in said bores, as shown in Figure 16, transversely to the longitudinal direction of members 52, permits the support members 52 to shift downwardly while retaining their longitudinally aligned position. Rod 54 has at its longitudinal center a lug with a bore for guiding a slide rod 55 connected to the expanding member 56 positioned between the wedge surfaces of said support members. The function of said member 56 is to spread the support members 52 and to securely clamp the carriage $a$ to the cable T by means of the clamping ledges 51'.

The expansible member 56 is linked to lever 57 which is pivotally mounted on front wall 1 by means of an axle, as shown in Figure 14. A connecting lever 58 rigidly joined to said axle contacts the operational lever 43 of the clamping means, and the lever 43 has on its longitudinal axis pin 59, as shown in Figures 14 and 15, which projects into oblique slot 60 of lever 58, as further shown in Figures 7 and 8. The oblique slot 60 opens into a circular arc-shaped branch 61 which is in the longitudinal direction of the connecting lever 58.

The pulling action on pawl 42 by displacement of the plates 25, 25 of slide $b$ causes a turning of lever 43 connected to spindle axle 44 and thus a movement of nuts 45 and 46 towards each other. At the same time, pin 59 mounted on lever 43 and projecting into oblique slot 60 of lever 58 exerts a pressure on lever 58 which is then turned downwards until the pin 59, which is exerting the pressure, comes to rest in the circular arc-shaped branch 61 of the slot 60 which now runs eccentrically with the axis of spindle axle 44. Because this downward turning movement of the lever arm 57 is inwardly, whereupon the expanding member 56 in contact therewith is moved inwardly towards the wedge surfaces of the support members 52, which are thereby kept apart. In this movement of one support member 52 away from the other support member 52, the twin levers 51 are swung around and the clamp-ledges 51', 51' are brought against cable T and are clamped against said cable T, thereby halting the carriage $a$ in its movement therealong.

With the continuous turning of lever 43 the connecting lever 58 will remain stationary since the pin 59 will move in slot 61 without exerting any pressures, whereby the clamping ledges 51', 51' will be pressed against the cable T because of the natural weight of the members 32 and 33, and the component parts attached thereto. In accordance with the weight which is to be hitched onto the load hook, including the head 87, of the hoisting rope F, an additional pressure will be exerted on the clamping ledges 51', 51' for final clamping of cable T through the sheave 31, the plates 25, 25 of slide $b$, the cam lever 37, the pawl 42, the lever 43, the screw spindle 44, and the nuts 45 and 46.

Now, if the load hook is drawn up, the plate 96 will push the strutting members 32, 33, 32', 33' upwards through the agency of the plates 72, as shown in Figure 8. Simultaneously, the clamping devices including the ledges 51', 51' will be released because of the swinging around of the twin lever 39 having the arresting hook 39'' and being spring loaded, as clearly shown in Figure 9. The cam lever 37 which is released by said swinging around tilts over because of the tension which the hoisting cable F has exerted in streaching, and the pawl 42 is released enabling the spring-loaded lever 43 to swing in counterclockwise direction, thereby causing the nuts 45 and 46 positioned on spindle 44 to shift apart. Simultaneously with this swinging of lever 43, pin 59 thereof which is positioned in the circular arc-shaped slot 61 of connecting lever 58 also moves back. On pin 59 entering the oblique slot 60, the connecting lever 58 moves upwards, and simultaneously with the upward movement of connecting lever 58 the lever 57 also swings. Lever 57 being connected to the expanding member 56 positioned between the support members 52, 52, draws member 56 out of the locking means and back into its initial position, whereupon the support members 52 once again mutually support each other. This movement brings about the swinging of the twin lever 51 supported on nuts 45 and 46 of screw spindle 44 so that the clamping ledges 51', 51' are removed from around cable T, whereupon the hoisting and conveying apparatus including carriage $a$ can again be moved along cable T. When the clamping device is thus in open position its clamping ledges 51', 51' are apart to such extent that the carriage $a$ will pass along the cable T even if it is on horizontal curves.

When the clamping ledges 51', 51' are opened, the spring 34, which had previously been under tension upon the lifting of the strutting members, will shift the slide members 25, 25 of slide $b$ to the right and out of the carriage housing, viz from the position shown in Figure 8 into the position shown in Figure 2, whereby the pawl 42 into the position shown in Figure 2, whereby the pawl 42 will be pushed over the nose of cam lever 37 and be again ready for the next clamping release.

As shown in Figure 2, the load-carrying device is positioned on slide plate 25 in such a way that the end of the hoisting cable F guided over sheave 31 and provided with the load hook passes through the longitudinal center of said load-carrying device. The twin plates 62 of the load carrying device, each being pivotally mounted on each of the plates 25, 25 of slide $b$, are connected by transversely positioned bolts, as clearly shown in Figure 4. Between and attached to the twin plates 62 are positioned two load-carrying levers 63, 63 having cam surfaces and being pivotally mounted on two transverse bolts 64 in such a manner that the cam surfaces face each other, as shown in Figures 17 and 18. The head 87 of the load hook will rest on said cam surfaces of levers 63, 63. At the end of each lever 63 opposite to the pivot point about bolt 64 is attached a knee-joint lever arm 65 having rectangularly secured to its free end an arm 65'. One of said arms 65' forms a knee lever which is pivotally mounted on transverse bolt 66 which also connects the twin plates 62, 62, as shown in Figures 17 and 18. The swing bolts 67, as shown in Figure 20 connect the knee-joint lever arms 65 and project on both sides of the knee arms. Said bolts 67 carry sliding rods 68 which slide in guides 69 secured to the twin plates 62. A helical spring 70 surrounds the sliding rod 68 and is positioned between the guide 69 and the swing bolt 67. Said spring 70 presses the cams of the load carrying lever 63 away from under the head 87 of the load hook.

As shown in Figures 4 and 18, supporting cross beams connect plates 72 which are hinged to the strutting members 32 and 32. Two cross beams 73 serve for inserting the head 87 of the load hook into the load carrying device when lifting the bent strutting. In combination with these plates 72 guide sheaves 74 for the hoisting and conveying cable F are provided to prevent skidding of the load. As clearly shown in Figures 4 and 8, the guide sheaves 74 for cable F prevent entanglement of said cable in carrying a load positioned adjacent to the path of travel of carriage $a$. Above the load carrying levers 63 are positioned two levers 75 actuated by the head 87, as shown in Figure 20, said levers 75 serving as a means for locking the angular lever 65' of knee joint structure 65 when the load has to be lowered on a stretched hoisting cable.

The opening and closing of the load-carrying device is carried out in the following manner, and particular reference is made to Figures 4, 7, 8, 17, 18, 19, 20, 21, and 22.

By causing the strutting members 32, 33, 32', 33' to be bent inwardly, said strutting members connecting the carriage $a$ and the plates 25, 25 of slide $b$, the plates 72 secured to the fixed lever arm 32 will drop resulting in the cross beams 71 which support the knee joint 65 moving downward. The moving of said cross beams downward will allow the spring-loaded slide rods 68 to act on the knee joints 65, thereby causing the withdrawal of the cam surfaces of the load-carrying lever 63, whereupon the head 87 of the load hook is released and then, together with the hoisting cable F, slides towards the ground, as clearly shown in Figure 7.

After the load is attached and the hoisting cable F is raised the plate 96 positioned on the load hook neck contacts the cross beams 73, and, during the lifting of the load, the head 87 of the load hook enters the load-carrying device including levers 63. Shortly after the head 87 of the load hook has entered the load-carrying device, the supporting cross beams 71 cause the knee-joint lever arms 65 to stretch, causing the cam surfaces of the load-carrying levers 63 to engage the head 87 at its bottom surface, and members 65 are kept in their locked positions by the supporting cross beams 71, as clearly shown by Figures 20 and 21. At the closing of the load-carrying device, the shoulder 32a, shown in Figures 7 and 8, being positioned within the range of support cam 28''' of cam disc 28, has been lifted above cam 28''', and shoulder 32a, in so moving, has urged support cam 28''' into said cam disc 28, as shown in Figure 10. During this lifting of the load, the strutting members 33 and 33' are shortened due to the compression of spring 44. Shoulder 41, as shown in Figure 7, of the toggle joint 35 connecting the members 32, 33 and 32', 33' contacts stop 40, shown in Figures 9, 12, and 13, of the twin lever 39 in whose hook 39'' the cam lever 37 engaged with pawl 42 is secured, the cam lever 37 is then caused to swing around, as shown in Figures 9, 10, 11, 12, and 13. This swinging then releases cam lever 37, and said cam lever 37 is tilted over as a result of the tension of the hoisting cable F on the pawl 42. Said cam lever 37 then imparts a blow to the pawl 42, and the spring-loaded lever 43 is then swung, whereupon the clamping ledges 51', 51' are released from the carrying cable T. Upon the release of the clamping device including the clamping ledges 51', 51' from the cable T, the carriage a is displaced by the action of the compressed springs 34, 34' about the strutting members 33, 33' until the roller 26' comes to rest against the shoulder 25' of the plate 25 of slide b. During the displacement of carriage a clamping ledges 51', 51' are removed from about the cable T, and the load hook including head 87 comes to rest on the cam surfaces of the load-carrying lever 63. Further, the shoulders 32a on the strutting member 32 rests on support cam 28''', and the hoisting and conveying apparatus including carriage a is then ready to travel along the carrying cable T.

Reference being made to Figures 17, 18, 19, 23, and 24, it is seen that the load hook including head 87 is so constructed that light loads can be lowered on a slack hoisting and conveying cable and heavy loads can be lowered on a tensioned hoisting and conveying cable. The end of the hoisting and conveying cable F is inserted in the longitudinal bore of neck 76 of the load hook and is securely connected thereto by rope clamp 77. Neck 76 has a threaded lower portion and has attached thereto collar 78. Also, at the lower portion of neck 76 is attached the offset arm 79 and at the end of the offset arm is bolt 80 on which load-carrying lever 81 is pivotally mounted. The load-carrying lever is held in a closed position by locking lever 82 which is attached to collar 78, as clearly shown in Figures 17 and 18. The end portion of neck 76 opposite to the end portion at which collar 78 is positioned has a recess 84 having a chamfered portion 83, as clearly shown in Figures 19, 23, and 24. Recess 84 receives the guide boss of nut 88 which is fixedly attached to stem 86 of head 87 of the load hook, nut 88 having a neck portion opposite to the guide boss 85. Helical spring 90 is positioned within the casing 92 and between the collar 9 of nut 88 and the top portion of casing 92, as clearly shown in Figures 17 and 18. Casing 92 is threadedly fitted to neck 76 and has, at the end portion thereof, peripheral bores 93 having positioned therein spring-loaded pins 94. Said spring-loaded pins 94 support themselves on the periphery of neck 76 and project above the periphery of casing 92. The said pins 94 also are in engaging relationship with the support plate 96 at an annular groove 95 thereof, plate 96 being movably arranged on casing 92, whereby said plate 96 is supported. In the hoisting of the load, support plate 96 lifts cross beams 73 of the locking and support device and causes the locking of the load-carrying device including the head 87 with the load carrying levers 63. Should it be desired to carry lighter loads which can be lowered on a slack hoisting load, the component parts of the load hook structure can be combined into a solid unit, since casing 92 is threadedly connected to collar 78 of said load hook structure, as clearly shown in Figures 17, 18, and 19.

The lowering of heavy loads in the aforementioned manner is difficult of accomplishment because of the tightening of the hoisting and conveying cable F, caused by pull exerted by the carriage a in passing along the cable T. Should the load carrying device including load carrying levers 63 be opened before the hoisting and conveying cable F be tensioned, the load hook carrying the load will fall until the hoisting cable will have been tensioned by the full load weight. The distance through which the load will fall is greater the less slack the cable F is and the longer the distance between carriage a and winch W. Thus the lowering of light loads cannot be carried out.

To lower lighter loads, a device is provided whereby the hoisting cable can be placed under tension before the lowering of the load. The vertical position of head 87 is adjustable with regards to the vertical position of plate 96. During the carrying of the light loads, head 87 is at such a distance away from plate 96 that levers 65', which are caused to be actuated by plate 96, swing out before the levers 75, which are moved upwardly by head 87, have returned to their lower positions.

In the lowering of heavy loads, the levers 75, in reducing the distance between the head 87 and the plate 96, will reach a lower position prior to the inward swinging of levers 65' to a position below the said levers 75. Thus, an additional locking action of the cam surfaces of levers 63 with the under surfaces of head 87 is brought about through the functioning of levers 65' and levers 75. This additional locking action is in effect at the time carriage a has reached the unloading point and the locking device has already been released through the action of the time-release pump 5, thereby preventing the falling of the load. If the hoisting cable F has been placed under tension by winch W to such extent that head 87 is lifted from the cam surfaces of levers 63, the levers 75 will be moved upwards, and the levers 63 will assume their open position, since the plate 96 has been shifted to collar 78 and does not act in the same manner as it would have acted if it were in the normal upper position. Thus, the heavy load can be lifted on the previously tensioned hoisting cable F without being damaged. To lock the head 87 of the load hook after the said hook has been again lifted, plate 96 has to be manually moved upwards in order to close the locking levers 63.

With particular reference to Figures 20, 21, 22, 23, and 24, the lowering of heavy loads is carried out in the following manner:

Casing 92 is manually screwed upwards on neck 76 of the load hook to adjust the casing 92 up to stop 97 positioned on the stem of the load-carrying head 87 thereby allowing spring 90 positioned between the inner positioned edge of casing 92 and collar 91 to be relieved of tension. This displacement of casing 92 results in the outward displacement of pins 94, positioned therein, and supporting plate 96, to support themselves on collar 91 of nut 88. The load is now attached to the so-positioned hook and is drawn into the load-carrying device. Upon the entrance of head 87 into the load-carrying device, locking levers 75 are lifted by head 87 of the load hook, and the knee-jointed lever arms 65' connected to load-carrying levers 63 are moved slightly out of alignment by supporting cross beams 71 whereupon the projecting arms 65 of the knee-jointed or toggle levers positioned in an angular position with reference to the load carrying device are swung outwards, as clearly shown in Figure 20. After the head 87 comes to rest on the cam surfaces of the load carrying levers 63, locking levers 75 will drop and the outwardly swung lever arms 65' will move inwardly. Since locking levers 75 are first to reach their bottommost position, the inwardly swung lever arms 65' will rest against lever 75 and will be stopped thereby. Simultaneously with head 87 coming to rest on the cam surfaces of load-carrying levers 63, casing 92 is shifted downwardly by the suspended load, head 87 being held in position by the cam surfaces of levers 63. As a result of this downward displacement of casing 92, a groove is formed between collar 91 and chamfer 83 of neck 76, as clearly shown in Figures 17 and 19. The spring loaded pins 94 positioned in the casing 92 enter the grooves and release the plate 96 enabling it to drop to the collar 78 of the load hook, as clearly shown in Figure 21.

The so-positioned load hook with the load suspended therefrom then is free to travel, and does travel, together with the carriage $a$ moving along cable T. At any chosen unloading station carriage $a$ is stopped, and the locking means is released by the push rod 19 which is actuated by the time-release pump 5, whereupon strutting members 32, 33, 32', 33' bend inwardly, and carriage $a$ becomes clamped onto the cable T, in the manner described. The inward bending-in of said strutting members permits the supporting cross beams 71 of the twin plates 62 of the load carrying device fitted to plates 25, 25 of slide $b$ to be removed from the toggle joint of the levers 65 without the moving of said levers 65 about the said toggle joint. The levers 65 are then held in their extended position by the locking levers 75 of the load carrying device including the twin plates 62, as clearly shown in Figure 22.

The load is slightly lifted, whereupon the locking levers 75 are swung out of their locking positions by head 87 of the load hook, and the angular lever arm 65' is released so the knee-jointed lever 65 bends inwardly under the pressure of spring 70. Then the cam surfaces of the load-carrying levers 63 are drawn away from under head 87 thus allowing the load to be lowered on the previously tensioned hoisting and conveying cable F. In removing the load, the plate 96 has to be shifted back into its original position in which it is then held by pins 94 projecting from casing 92 of the neck 76 of the load hook.

In summation, the operation of the hoisting and conveying apparatus whose component parts, and their respective operations, have been specifically set forth in the foregoing detailed descriptions, is carried out in the following manner:

The hoisting and conveying cable is released, and the carriage $a$ passes along the cable T to a loading station where it is stopped. During the carriage movement along its path of travel on cable T, the time-release oil pump 5 is actuated, and, under oil pressure, the compression of spring 15, which is operatively positioned about piston rod 16 operatively connected to thrust rod 19 through offset rod 17 and angular lever 18 which is connected to said rod 19. When carriage $a$ is stopped above the loading point, the oil feed causing the compression of spring 15 is stopped, thereby causing the relief of spring 15 which allows the downward movement of piston rod 16 and offset rod 17, thereby causing the thrust rod 19 to move in a forward direction, as clearly shown in Figure 5. This forward displacement of thrust rod 19 causing the swinging of locking lever 24 of the locking device, which, in its released position, permits the bending-in of the strutting members 32, 33, 32', 33'. This bending-in of the said strutting members causes the plates 25, 25 of slide $b$ to move into the inside of the housing of carriage $a$, whereupon pawl 42 hinged to operations lever 43 of the carrying cable clamping means is actuated, and the clamping of the clamping ledges 51', 51' to the cable T is brought about. The bending-in of said strutting members, which takes place shortly after the clamping of carriage $a$ at clamping ledges 51', 51' to cable T, releases head 87 of the load hook from the load-carrying device, thereby allowing the lowering of the load hook for accepting a load. After the load has been attached to the load hook, the hoisting cable F is wound up on its cable drum, thereby raising the load. The plate 96 engaging the locking and supporting device lifts the toggle joint 35 of the strutting members, and said strutting members are brought back into their extended position in which they are held by means of the shoulder 32$a$ and the support cam 28'''. Simultaneously with the foregoing positioning of the respective members the head 87 of the load hook is brought into the load-carrying device which is then closed by the locking and supporting device. Wen the head 87 reaches its end position, the twin lever 39, positioned in the plates 25, 25 of slide $b$ and provided with a hook portion, is swung, whereupon the cam lever 37 contacting pawl 42 is tilted over thereby releasing said pawl. The release of pawl 42 brings about, through the means of operations lever 43 of the clamping device, the release of the clamping ledges 51', 51' from about cable T, thereby permitting the housing, including walls 1, 2, and 2$a$, to take up its original position. Thus, the said hoisting and conveying apparatus having a load attached thereto is ready to pass along cable T to the unloading station by releasing or winding up the hoisting cable F on the cable drum, as the case may be.

To avoid the operation of a time-release oil pump, thereby actuating the load carrying device, upon the accidental stopping of the carriage $a$ on cable T a distance-release means may be used to actuate the load-carrying device or a distance-release means in combination with a time-release oil pump may be utilized.

With particular reference to Figure 25, carriage $a$ on cable T, said carriage $a$ having rollers, shown by broken lines, is positioned on cable T. As further clearly shown in Figures 26 and 27, the distance-release means comprises disc 100 mounted on rotatable axle 101 driven by reduction gear 102 by means of a roller engaging the carrying cable T in such a manner that disc 100, after carriage $a$ has travelled over the entire length of cable T, is rotated less than 360°. Disc 100 is provided with distance scale 103 having positioned thereover movable stops 105 and 106 which are each adjustable by set screws 104. Should it be so desired, one stop may be used. For loading and unloading at any predetermined position of the carriage $a$ in cable T, both stops should be used. If only one pickup of a load is to be made and the said load is to be unloaded at the one end of the hoisting cable F, only one stop is to be used.

The stop members 105 and 106 are provided each with a window 107 through which scale 103 is visible. Said stop members 105 and 106 also have end portions overlying the rim of disc 100, said end portions being formed with an edge 108 having two inclined surfaces meeting at a common point. On window 107 is a graduation line indicating the position of edge 108, by means of which the position of each stop can be accurately set on the said scale.

A toggle lever 109 is rotatably mounted on the housing of carriage $a$, said lever 109 having arm 109$a$ in contact with disc 100 by means of edge 110, formed by two surfaces inclined one towards the other and meeting at an apex of the angle formed thereby, as clearly shown in Figure 26. Lever 109 is subject to the action of spring 111 which urges it against disc 100. The other arm 109$b$ of toggle lever 109 is positioned opposite the end of release lever 24, and its movement brings about the desired movements of the component parts mounted in and on the carriage 9.

With particular reference to Figure 27, part 100$a$ of disc 100 carrying scale 103 is rotatably mounted on axle 101 and is capable of being secured in any desired angular position by manipulation of central set screw 113.

The foregoing described distance-release means is operated in the following manner:

Stops 105 and 106 are adjustably positioned for stopping carriage a on cable T at a loading station and then at an unloading station along the path of travel of carriage a on said cable.

As the carriage a travels on cable T, disc 100 which contacts edge 110 of lever 109 revolves. Lever 109 does not move until one of the stops 105 or 106 contacts it and the edges 108 and 110 come to rest on each other. Lever 109 then takes the position shown in broken lines in Figure 25 and causes the movement of release lever which is responsible for the stopping of the carriage and for actuating the load-hitching device, as described previously in Figures 1–24, inclusive.

After the load has been pushed up and raised, the carriage may continue along its path of travel until the next predetermined position at which time the other stop member comes into action.

Figure 28 shows the carriage a having the combination of a distance-release means and a time-release means which replaces the time-release mechanism shown in Figure 2.

Carriage a rests with its roll members on carrying cable T. The distance-release means is actuated in the same manner and is constructed as set forth in the foregoing description. In the present embodiment of Figure 28 the shape of stops 105 and 106 are of different configuration and instead of having an edge of a shape similar to that of edge 108, are provided with surface 114. Thus, the time-release means can be made effective over a longer distance.

The time-release means consists of cylinders 115 and 116 in which pump pistons 117 and 9, respectively, are provided. The piston 9 is driven by the movement of carriage a, and the piston 117 moves against spring 118, as clearly shown in Figures 28 and 33. Oil is pumped in cylinder 115 through channel 8″, and the construction and function of the oil pump is substantially the same as the pump of Figure 5, like numerals being here used in Figure 33.

Upon the carriage a being stopped at a predetermined position along cable T, the pump piston 9 stops and the flow of oil from 6′ to 7′ through channel 8″ ceases causing the relaxing of spring 118 and the accompanying flow of oil from the pressure chamber 7″ through channel 8‴ into oil chamber 7′ together with the upward movement of piston 117 under the action of the spring 118.

An arm 119a of toggle lever is hinged on the rod of the piston 117 and the toggle lever 119 is rotatably mounted on the housing of carriage a. On the other arm 119b of toggle lever 119, a lever 120 is hinged, and the lever 120 contacts disc 100, being held in contact with said disc 100 by spring 111.

The end of the lever 120 is positioned near the end of release lever 24 which operates in the same manner as described in connection with the two other embodiments.

Distance-release 100 is adjusted in the manner as set forth in the description of the previous embodiment.

If either stop 105 or 106 engages lever 120, the stop will take the position as shown in Figure 28, and its free end will come to rest in a position opposite to the end of release lever 24, and the carriage a will be stopped at the desired position. At the same time, the oil pump piston 9 will cease operation, and the piston 117 will, under the action of spring 118, move towards the top portion of cylinder 115 in accordance with the above description. Then the toggle lever 119 will be turned about its axis and cause a longitudinal displacement of lever 120 which will contact release lever 24 and actuate same.

Should carriage a be caused to stop at an unexpected stop, no actuation will take place since the end of lever 120 will rest above the end of release lever 24.

Figures 30, 31, and 32, as previously set forth, show an alternative embodiment of a clamping device for holding carriage a securely on carrying cable T.

As clearly shown in Figure 30, cable T and the carriage rollers are shown. On the carriage a, longitudinally displaceable clamping jaws 125 are provided on both sides of cable T. The inner width of the open clamping jaws is of such a dimension that the passing therethrough of intermediate supports with horizontal angles, viz. up to approximately 6°, and of curved supports, viz. up to approximately 90°, is possible. The clamping members 125 have two wedge surfaces 139 and 140, as clearly shown in Figure 31, for causing a quick clamping action by clamps 125 and for causing said clamps 125 to exert sufficient pressure against cable T for clamping. Clamps 125 are each joined by a knuckle joint to rod 126 which is rotatably fitted to arm 127a of toggle lever 127. The other arm 127b is connected to rod 128 having a free end provided with guide 129 for rod 131 which slides therein against the action of spring 130, as clearly shown in Figure 30. Rod 131 is hinged to a swing lever 132 rotatably mounted to the housing of carriage a. The free end 133 of lever 132 rests on arm 134a of a double-armed lever 134, and the other arm 134b of said lever 134 engages release lever 24.

At the end portion 133 of lever 132 is hinged part of the load-hitching device 135 which is guided towards hoisting rope F over roll sheave 136. Spring 137 or a weight (not shown) urges the lever 132 downwardly by acting on said end portion 133 thereof.

The clamping jaws 125 are of the shape clearly shown in Figures 31 and 32, and springs 130a normally keep said jaws 135 out of engagement with cable T. Each clamping jaw has two recesses 138 which are contiguous with a substantially inclined surface 139 which continues as an additional and slightly inclined surface 140. A roll 141 is positioned in each recess 138, and said roll 141 is rotatably mounted on a common support 142 which carries a pair of rolls, as clearly shown in Figures 31 and 32.

This device operates in the following manner:

When release lever 24 is actuated by one of said control devices, the lever 134 is released and turned about its axis thereby releasing the end 133 of lever 132. Lever 132 is pressed downwards by the force exerted upon it and pulls rod 128 whereupon toggle lever 127 is caused to turn about its axis. Arm 127a moves in counterclockwise direction and pulls the rod 126 and also the clamping jaws 125 which move parallel to cable T. Because of this movement, rolls 141 engage the inclined surfaces 139 and 140, and the clamping jaws 125 are urged against cable T by the spring acting on lever 132 and by the load acting on the hoisting cable F.

The lever 132 and rod 131 are moved upwards by the impact of plate 135a of the load hook, and the spring 130 is thereby compressed. Carriage a will be moved to the right by the force of its own weight, and, where the slope is sufficient, by a cable G, as shown in Figure 28, of a counterwinch, whereby rolls 141 roll off from the wedge surfaces 139 and 140. As soon as the clamping jaws 125 are relieved of the pressure of the rolls 141, they are displaced to the left up to stops 125a, by the spring 130.

The distance-release means of the latter so-described embodiment can be actuated either by a carriage roll or by a spring-loaded roll having a leather or rubber coating urged against carrying cable T.

The time-release means can be mechanically, electrically operated, or electromagnetically operated. Also, said time-release means can be operated by centrifugal force.

Many alterations and changes may be made without departing from the spirit and scope of this invention which is set forth in the appended claims which are to be construed as broadly as possible in view of the prior art.

I claim:

1. A hoisting and conveying apparatus comprising, in combination, a carrying cable, a carriage movably positioned on said cable, a hoisting and conveying rope means for controlling the movement of said carriage along said carrying cable and for hoisting a load, said latter rope means being operatively connected to said carriage and passing therethrough, said carriage having operatively connected thereto a load-hitching device and at least one clamping means for engaging said carrying cable, control means for automatically operating said clamping means, for automatically releasing said load-hitching device to receive the load to be hoisted, and for resecuring the load-hitching device to the carriage after the load has been hoisted, said control means being mounted on said carriage, rolls attached to said carriage, said rolls engaging said carrying cable and being operatively connected to said control means, and means operatively connected to said rolls and said control means for actuating said control means upon movement of said carriage along said carrying cable and upon stopping of said carriage at a predetermined position on said cable, whereby a single rope means is utilized for both hoisting the load from the ground to the height of the hoisting and conveying apparatus and hauling the load, thereby obviating the necessity for an additional pull rope means to hold the carriage in position while the load is being hoisted.

2. A hoisting and conveying apparatus comprising, in combination, a carrying cable, a carriage movably positioned on said cable, a hoisting and conveying rope means for controlling the movement of said carriage along said carrying cable and for hoisting a load, said latter rope means being operatively connected to said carriage and passing therethrough, said carriage having operatively connected thereto a load-hitching device and at least one clamping means for engaging said carrying cable, control means for automatically operating said clamping means, for automatically releasing said load-hitching device to receive the load to be hoisted, and for resecuring the load-hitching device to the carriage after the load has been hoisted, said control means being mounted on said carriage and including a time-release oil pump means, rolls attached to said carriage, said rolls engaging said carrying cable and being operatively connected to said time-release oil pump means, and means operatively connected to said rolls and said time-release oil pump means for actuating said time-release oil pump means upon movement of said carriage along said carrying cable and upon stopping of said carriage at a predetermined position on said cable, whereby a single rope means is utilized for both hoisting the load from the ground to the height of the hoisting and conveying apparatus and hauling the load, thereby obviating the necessity for an additional pull rope means to hold the carriage in position while the load is being hoisted.

3. A hoisting and conveying apparatus comprising, in combination, a carrying cable, a carriage movably positioned on said cable, a hoisting and conveying rope means for controlling the movement of said carriage along said carrying cable and for hoisting a load, said latter rope means being operatively connected to said carriage and passing therethrough, said carriage having operatively connected thereto a load-hitching device and at least one clamping means for engaging said carrying cable, rolls attached to said carriage, control means for automatically operating said clamping means, for automatically releasing said load-hitching device to receive the load to be hoisted, and for resecuring the load-hitching device to the carriage after the load has been hoisted, said control means being mounted on said carriage and including a time-release oil pump means, said time-release oil pump means including a pump housing having two interconnected cylindrical chambers, a piston mounted in the first of said chambers, a spring means for urging said piston downwardly in said chamber, said piston being operatively connected with said clamping means and said load-hitching device, said piston separating said first chamber into an upper chamber and a lower chamber, said spring means positioned in said upper chamber, another piston mounted in the second of said chambers, a channel means for connecting said second chamber with said lower chamber, a channel means for connecting said second chamber with said upper chamber, a channel means for connecting said upper chamber and said lower chamber, a check valve positioned in the channel means connecting said second chamber and said lower chamber, channel means for connecting said upper chamber and the upper portion of said second chamber, said latter channel means being of a small cross-sectional area with respect to the cross-sectional areas of the first and second chambers, whereby the load-hitching device and the clamping means will not be placed in operation upon the stopping of the carriage on the cable for a short time over an undesired position, said rolls engaging said carrying cable, and means operatively connected to said rolls and other piston of said time-release oil pump means for actuating said other piston upon the movement of said carriage along said carrying cable and upon stopping of said carriage at a predetermined position on said cable, whereby a single rope means is utilized for both hoisting the load from the ground to the height of the hoisting and conveying apparatus and hauling the load, thereby obviating the necessity for an additional pull rope means to hold the carriage in position while the load is being hoisted.

4. A hoisting and conveying apparatus comprising, in combination, a carrying cable, a carriage movably positioned on said cable, a hoisting and conveying rope means for controlling the movement of said carriage along said carrying cable and for hoisting a load, said latter rope means being operatively connected to said carriage and passing therethrough, said carriage having operatively connected thereto a load-hitching device and at least one clamping means for engaging said carrying cable, a distance-release control means for automatically operating said clamping means and for automatically actuating said load-hitching device, said control means being mounted on said carriage and including a disc member, stop members mounted on said disc member, and a toggle lever arm operatively engaging said stop members, rolls attached to said carriage, said rolls engaging said carrying cable and being operatively connected to said distance-release means, and means for actuating said clamping means and releasing said load-hitching device after the carriage will have travelled for a predetermined distance along said carrying cable, said means being operatively connected to said toggle lever arm.

5. A hoisting and conveying apparatus comprising, in combination, a carrying cable, a carriage movably positioned on said cable, a hoisting and conveying rope means for controlling the movement of said carriage along said carrying cable and for hoisting a load, said latter rope means being operatively connected to said carriage and passing therethrough, said carriage having operatively connected thereto a load-hitching device and at least one clamping means for engaging said carrying cable, control means for automatically operating said clamping means, for automatically releasing said load-hitching device to receive the load to be hoisted, and for resecuring the load-hitching device to the carriage after the load has been hoisted, said control means being mounted on said carriage, said control means including a time-release oil pump and a distance-release control means, rolls attached to said carriage, said rolls engaging said carrying cable and being operatively connected to said control means, and means operatively connected to said rolls and said control means for actuating said control means upon movement of said carriage along said carrying cable and upon stopping of said carriage at a predetermined position on said cable and after the carriage has been stopped for a predetermined time interval.

6. A hoisting and conveying apparatus comprising, in combination, a carrying cable, a carriage movably positioned on said cable, a hoisting and conveying rope means for controlling the movement of said carriage along said carrying cable and for hoisting a load, said latter rope means being operatively connected to said carriage and passing therethrough, said carriage having operatively connected thereto a load-hitching device and at least one clamping means for engaging said carrying cable, control means for automatically operating said clamping means, for automatically releasing said load-hitching device to receive the load to be hoisted, and for resecuring the load-hitching device to the carriage after the load has been hoisted, said control means being mounted on said carriage, said control means including a time-release oil pump and a distance-release control means, a release lever operatively connected to said load-hitching device, said distance-release control means including a disc member and stop members mounted on said disc member, a toggle lever operatively connected to said time-release oil pump, a lever arm operatively connected to said toggle lever and in engagement with said disc, whereby there is caused a longitudinal displacement of said lever to actuate said release lever when a stop member engages said lever in engagement with said disc, rolls attached to said carriage, said rolls engaging said carrying cable and being operatively connected to said control means, and means operatively connected to said rolls and said control means for actuating said control means upon movement of said carriage along said carrying cable and upon stopping of said carriage at a predetermined portion on said cable and after the carriage has been stopped for a predetermined time interval.

References Cited in the file of this patent
UNITED STATES PATENTS

| | | |
|---|---|---|
| 868,984 | Guffin | Oct. 22, 1907 |
| 1,391,411 | Roces | Sept. 20, 1921 |
| 1,506,974 | Cooley | Sept. 2, 1924 |
| 1,569,176 | Dunham | Jan. 12, 1926 |
| 1,577,652 | Noble | Mar. 23, 1926 |
| 2,589,315 | Yelton | Mar. 18, 1952 |